United States Patent Office 3,315,712
Patented Apr. 25, 1967

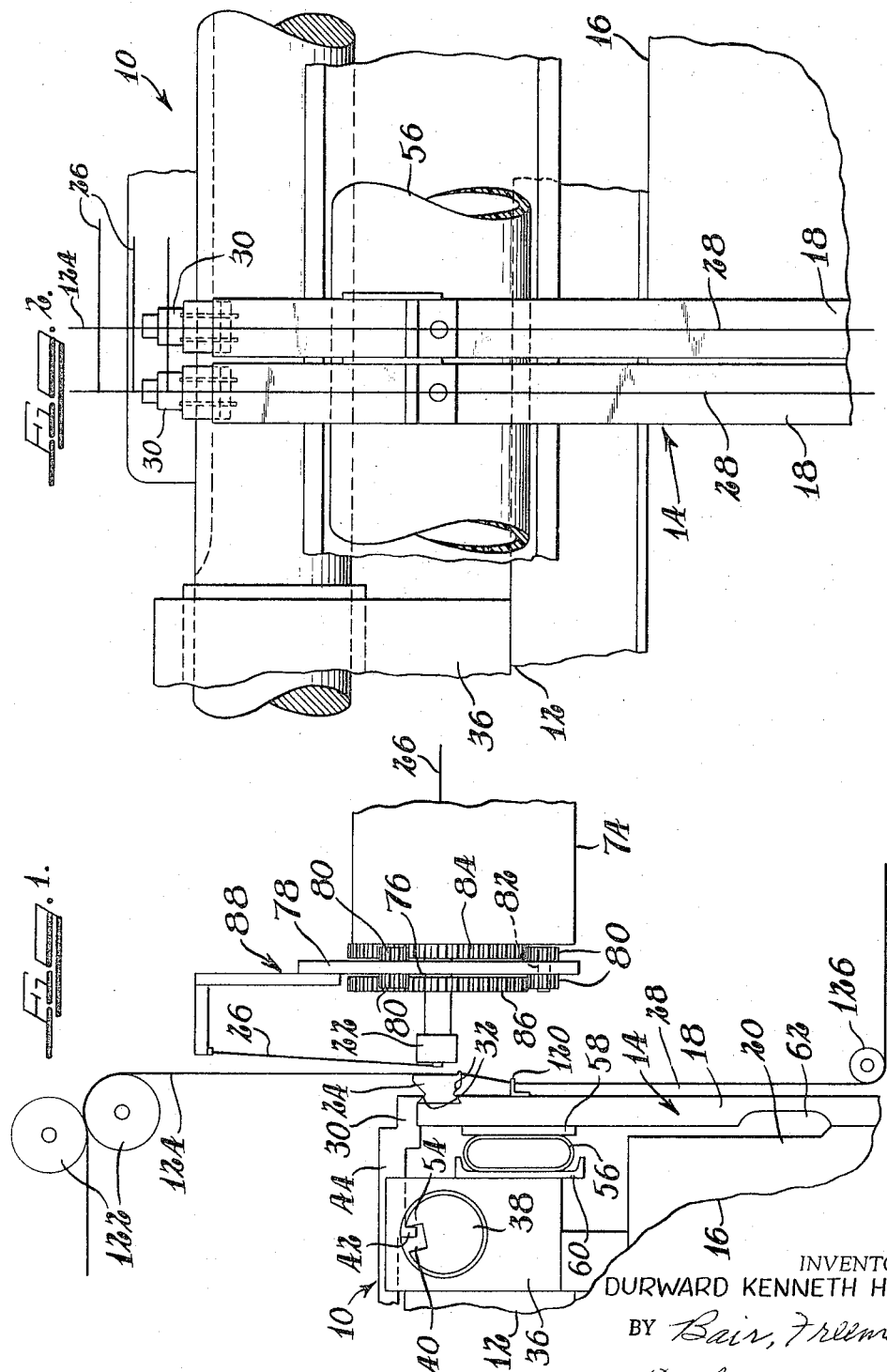

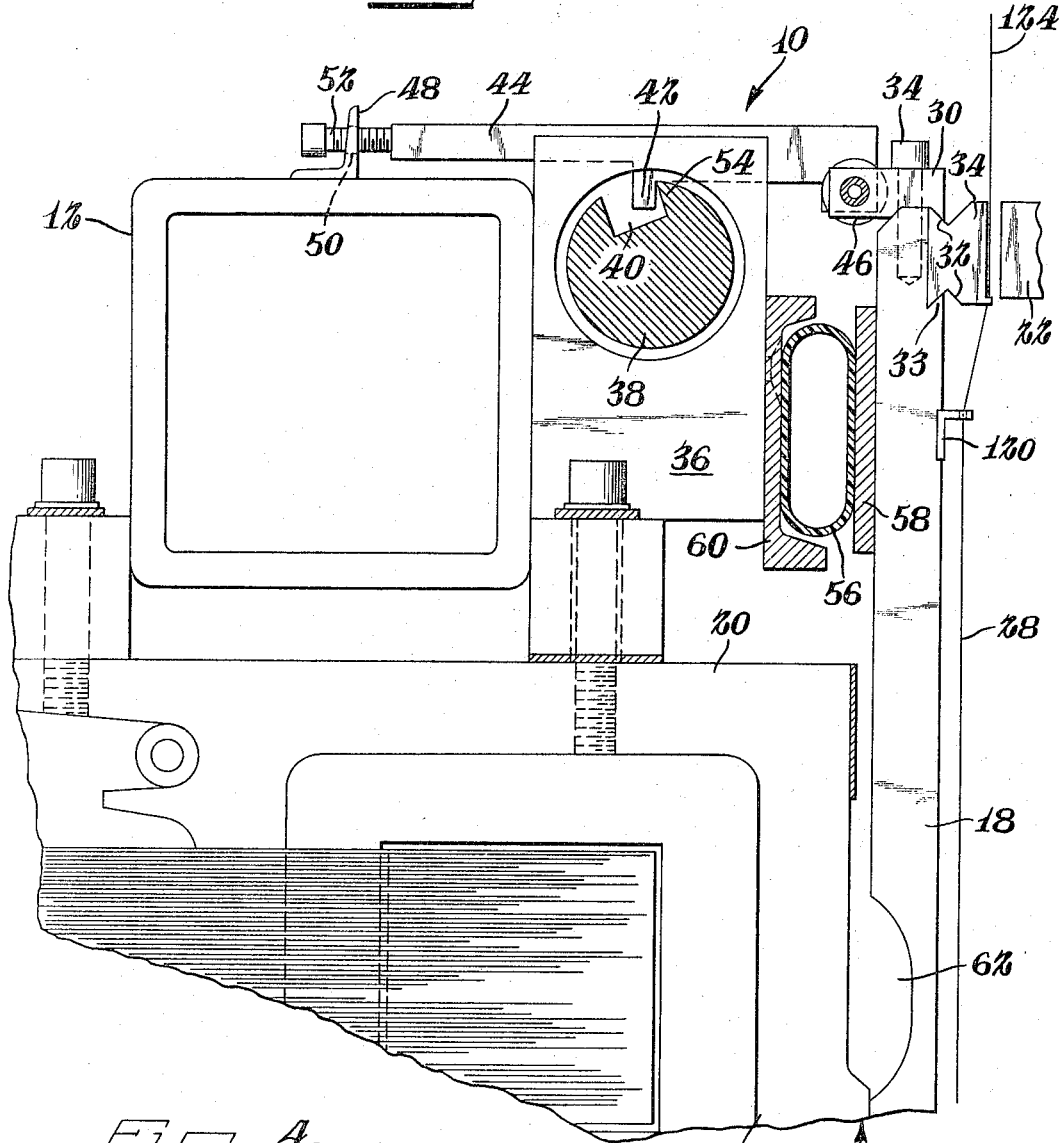

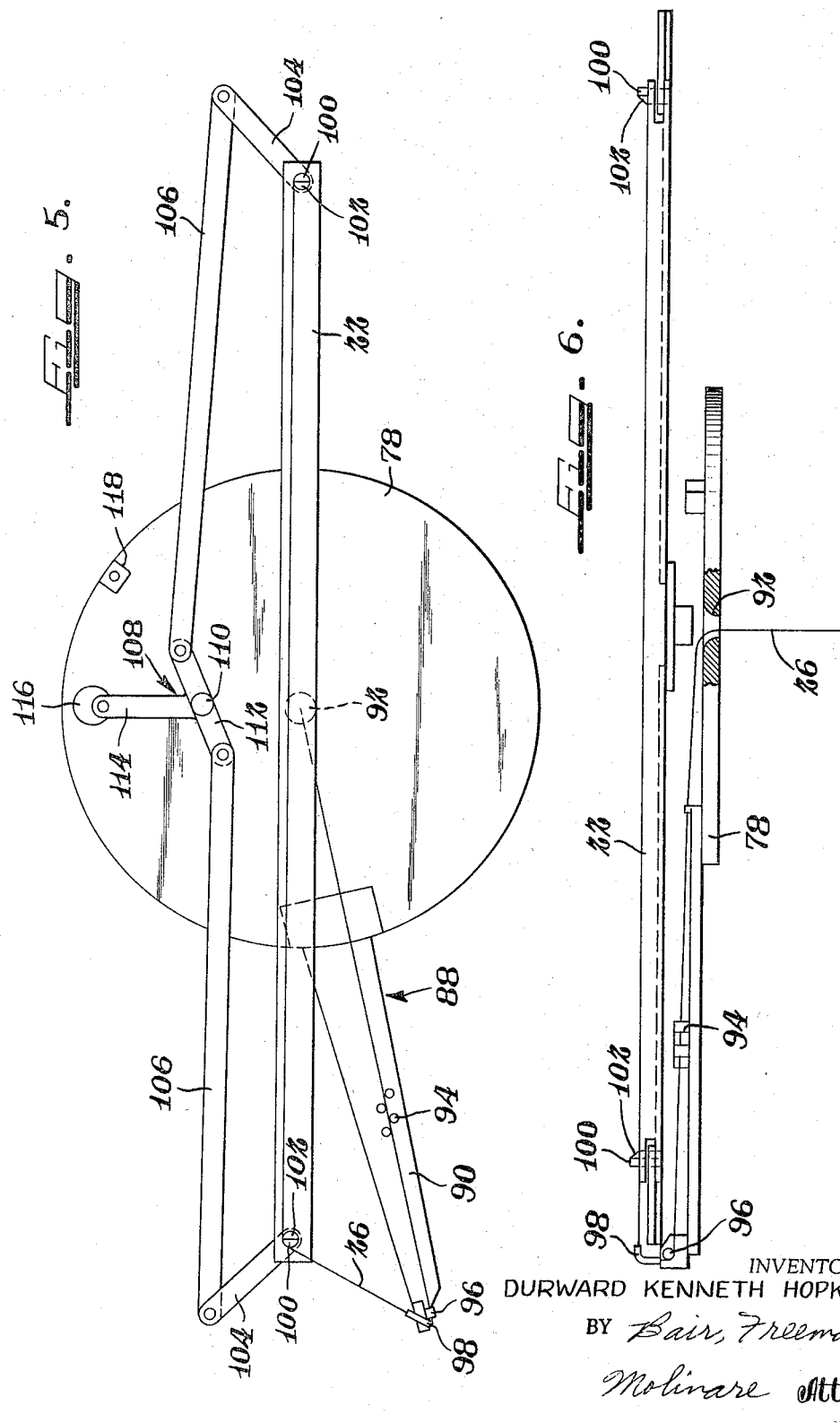

3,315,712
WIRE WELDING MACHINE
Durward Kenneth Hopkins, Peoria, Ill., assignor to Sommer Products Co., Peoria, Ill., a corporation of Illinois
Filed Aug. 19, 1964, Ser. No. 390,651
12 Claims. (Cl. 140—112)

This invention relates to an improved machine for welding wires crosswise to each other in order to form wire fabric or mesh.

Known machines for welding or forming wire fabric or mesh generally weld a plurality of a first set of wires, line wires, to a second set of wires, stay wires. The line wires are fed to the apparatus in a position substantially transverse to the welding apparatus, while the stay wires are fed to the apparatus in a position substantially crosswise to the line wires. In order to form the welded wire fabric, the welding operation occurs intermittently after the stay wires are in proper position relative to the line wires. Although the described known apparatus generally makes a satisfactory product, the apparatus is expensive and complex in construction since it is required that a plurality of both line wires and stay wires must be fed to the apparatus. Since it is highly desirable to provide a greatly simplified and less expensive wire welding machine, it is an important object of this invention to provide an improved wire welding machine wherein the advantages of the prior art constructions are retained while the construction thereof is simplified and the cost of manufacture is reduced.

It is also an object of this invention to provide an improved wire welding machine wherein a single stay wire is fed in a crosswise position to the line wires and no severance of the stay wire occurs prior to the welding operation.

Further purposes and objects of this invention will appear as the specification proceeds.

A particular embodiment of the present invention is illustrated in the accompanying drawings wherein:

FIGURE 1 is a schematic end view of my improved wire welding machine;

FIGURE 2 is an enlarged, front elevational view of a portion of my wire welding machine;

FIGURE 3 is an enlarged end elevational view of the embodiment of FIGURE 2;

FIGURE 4 is a diagrammatic view of means used for effecting the withdrawal of movable welding die means used in my wire welding machine;

FIGURE 5 is a front diagrammatic view of apparatus used for positioning the stay wire crosswise to the line wires in my machine; and FIGURE 6 is a top plan view of the embodiment of FIGURE 5.

Referring to the drawings, my improved wire welding apparatus 10 includes a frame 12 upon which is mounted electric welding apparatus, generally 14. The welding apparatus 14 includes a transformer 16 which is electrically connected to a plurality of electrical conducting arms 18, preferably made of copper. More specifically, each of the upright copper arms or fingers 18 is electrically connected to the secondary 20 of the welding transformer 16.

Referring particularly to FIGURES 2 and 3, the welding apparatus 14 includes an elongated, substantially horizontal unitary welding die 22, which is mounted on the machine frame 12, in a manner to be described in greater detail. In substantially direct alignment with the stationary die 22 are a plurality of movable welding dies 24. The movable dies 24 are individually secured to the individual copper arms 18, whereby electrical energy is applied for welding a single stay wire 26 crosswise to a plurality of substantially upright line wires, the wires 26 and 28 being interposed between the dies 22 and 24 during the welding operation.

Each movable die 24 is fixedly secured to the forward and upper portion of a copper arm 18 by means of a clamp member 30. Each of the dies 24 is provided with a pair of opposed V-shaped slots 32 therein; the lower of the slots 32 is adapted to engage a cooperating projecting portion 33 of the upright arm 18 while the upper of the slots 32 engages the clamp member 30. The clamp 30 is rigidly secured to the upper end of the arm 18 by means of a bolt 34 and it maintains the die 24 in firm position on and in electrical connection with the copper arm 18.

The machine frame 10 carries a support block 36 which carries an elongated oscillating weld die lifting cam 38. The elongated cam 38 is provided with a slotted portion 40, which engages each of the downwardly extending fingers 42 provided on the lifting members 44. Each lifting member 44 is insulatingly secured to each clamp member 30 by means of an insulating piece 46. The opposite end of each lifting member 44 is slidably carried by a retainer member 48 which has a plurality of apertures 50 therein for slidably receiving adjustable bolts or stop members 52, which are threadably secured into the rear end of the lifting member 44. When the cam 38 oscillates in a counterclockwise direction, as viewed from FIGURE 3, the forward wall 54 of the slot 40 engages each downturned finger 42 of each lifting member 44, to thereby withdraw the movable welding dies 24 from the stationary welding die 22 after the welding operation.

In order to effect a forward movement of the movable dies 24 towards the stationary die 22, a spring member 56 is provided. Desirably, an elongated wire reinforced air hose into which pressurized air is passed is utilized for applying uniform biasing pressure to each of the copper arms 18 and thereby to the movable welding dies 24. It is an important advantage to use air pressure in this manner due to the ready adjustability of the air pressure which provides the uniform pressure to the arms 18. In this way a substantially uniform welding pressure is applied to the stay wire 26 and to the line wires 28 during the welding operation as the wires 26 and 28 are interposed between the dies 22 and 24. The spring member 56 is adapted to normally bias the springable conductor arms 18 toward the stationary die 22. Support blocks 58 are mounted on each of the arms 18 and the air hose spring 56 abuts each of these blocks. The blocks or anvils 58 may be changed in dimension at each arm 18 so as to decrease or increase pressure according to the square inches in contact with the hose 56. The opposite side of the hose spring 56 is held in place by means of a U-shaped support member 60, which is aligned with the blocks 58 and is secured to the block member 36. Since the spring member 56 is interposed between the stationary U-shaped support member 60 and the blocks 58 carried on each of the fingers or arms 18, an outward biasing force is imparted to the copper arms 18. Each copper arm 18 includes a cut-out portion 62 which permits a small amount of bending of the arms 18 to accommodate movement of the movable welding dies 24 in and out of welding position.

Referring to FIGURE 4, in order to oscillate the cam member 38, an arm 64 is fixedly secured to the central portion of the cam 38. The arm 64 in turn is biased towards a rotating cam member 66 by suitable biasing means (not shown). The cam 66 is rotatably carried by the frame of the machine 10. The arm 64 carries a follower 68 which rides on a cam surface 70 of the cam 66. As the follower 68 moves in and out of the depression 72 in the cam surface 70, the desired oscillating movement is imparted to the cam 38 through the arm 64.

Referring particularly to FIGURE 1, the stay wire 26 is directed into the rear of a gear box 74, which is mounted on the machine frame 12. A shaft 76 is rotated, through the gear box 74, by suitable drive means, as an electric motor (not shown). The shaft 76 is secured to the rotating plate member 78. The outer periphery of the circular plate member 78 rotatably carries a plurality of planetary gears 80 which are mounted on opposite sides of the plate 78. A common shaft 82 fixedly carries the planetary gears 80. Each set of the three planetary gears, which are spaced about 120° apart, engages each gear member 84 or 86. The gear 84 is secured to the gear box 74 while the gear 86 is fixed to the stationary die member 22. Since the gear 84 is fixed and since the rotating planetary gears 90 mesh with both gears 84 and 86, the gear 86 and the stationary die member 22 are maintained in a fixed position even during rotation of the plate 78.

It is an important feature of the applicant's construction 10 that one or more rows of a single stay wire 26 be positioned transverse to the upright line wires 28 prior to welding, in order to form wire fabric. Referring to FIGURES 5 and 6, there is a schematic showing of apparatus utilized for so positioning the stay wire 26. (The gears 84 and 86 do not appear in FIGURES 5 and 6 for simplicity.) A radial arm 90 is fixed to the rotating plate member 78. A central aperture 92 is provided in the plate and permits the passage of the stay wire 26 in the arm therethrough. Guide members 94 are provided on the arms 90; the outer end of the arm 90 includes a guide roller 96 which turns the continuous stay wire 26 to a tubular guide member 98 which, in turn, directs the stay wire 26 towards the pivot pins 100. The pins 100 are mounted on the stationary die 22, on opposite ends thereof, and thereby permit the positioning of upper and lower rows of the stay wire 26 in crosswise position or transverse to the plurality of the upright line wires 28.

As viewed from FIGURE 5, the rotating plate member 78 and the wrapping arm 90 rotate in a counterclockwise direction and cause the stay wire to be wrapped around each of the pivotal pin members 100. The stay wire 26, upon a 360° rotation of the arm 90, mounts upper and lower rows of the stay wire 26 around the pins 100. After the welding operation has been completed and the two rows of the stay wire 26 have been welded to the line wires 28, the welded wire fabric is released from the pins 100 upon rotation of the pins 100 within the stationary die 22. The pins 100 have a slanted surface 102 which permits the release of the welded stay wire 26 therefrom after a rotation of 90° and an upward movement of the fabric.

In order to rotate the pins 100, each is fixedly secured to a cooperating link member 104. The links 104 are in turn pivotably secured to actuating arms 106; each actuating arm 106 is pivotably carried by a rotatable tripping member 108. The tripping member 108, pivotably carried by the plate 78 at 110, includes a base portion 112 and an upstanding leg 114 which is angularly positioned relative to the base 112. The upper end of the leg 114 rotatably carries a roller member 116. A block member 118, fixed to the outer periphery of the plate 78, is adapted to contact the roller member 116 and rotate the tripping member 108 about the pivot 110. This pivoting movement, through action of the arms 106 and links 104, rotates the pins 100 in the stationary die and effect a release of the welded stay wire 26 therefrom.

Although it is believed that the operation of the apparatus 10 should be clear from the foregoing, a brief description of the operation will be provided. A plurality of upright line wire 28 pass between the stationary die 22 and the movable dies 24. Each line wire 28 is guided into a proper spaced position between the dies 22 and 24 by use of guide members 120 which are insulatingly mounted on the copper arms 18. Any number of line wires 28 may be utilized, depending upon the width of wire fabric to be formed, the spacing of the wires, and the distance between the pins 100. A pair of roller members 122 may be provided for intermittent upward movement of the welded wire fabric 124 and the line wires 28 after a welding operation has been completed. A lower guide roller 126 may be provided for guiding the line wires 28 to the dies 22 and 24.

The upright line wires 28 are moved upwardly by the roller members 122 towards the dies 22 and 24. Simultaneously the wrapping arm 90 positions the stay wire 26 about the pivot pins 100 in the stationary die 22. Upon a substantially 360° rotation of the plate member 78 and 90 in a counterclockwise direction as viewed in FIGURE 5, upper and lower rows of the stay wire 26 are positioned on and stretched between the pins 100 and transverse to the plurality of line wires 28. When the stay wire 26 has been properly positioned and the upward movement of the line wires 28 has ceased; the cam 38 has oscillated clockwise sufficiently far to release the fingers 42 of all the lifting members 44 and thereby permit the pressurized hose 56 to move the movable dies 24 toward the die 22 under substantially constant pressure. This is important since substantially the same quality weld is provided at each weld. Since the line wires 28 and stay wires 26 are interposed between the dies 22 and 24, the crosswise wires are electrically welded at substantially the same time. During the welding operation, the wrapping arm 90 continues rotating since there is no adverse effect upon the positioning of the end of the wire 26 on the pin 100 while the welding of the wires proceeds.

After the welding operation has been completed, the cam 38 oscillates in a counterclockwise direction and engages the downturned fingers 42 of the lifting members 44 and withdraws the movable dies 24 from the stationary die 22. This releases the welded fabric from between the dies. Also, the rotation of the plate member 78 and the wrapping arm 90 proceeds and the block member 118 contacts the roller 116. This pivots the trip member 108 and through the links 104 and arms 106, the pins 100 are pivoted through substantially 90°. At this time, the upward movement of the welded wire fabric 124 moves the just welded rows of wire fabric upwardly along the slanted surfaces 102 of the pins thereby releasing the welded fabric. The upward movement of the fabric 124 and line wires 28 continues and the stay wire 26 is again wrapped around the pins 100, and another cycle of operation is started.

It is seen from the foregoing that the applicant's apparatus uses a single stay wire 26 rather than a plurality thereof. This cooperates to greatly simplify the cost and construction of the wire welding machine 10 and the product resulting from its use. Also, there is no necessity of cutting the stay wire either before or after welding, although if desired, the lateral edges of the wire fabric may be severed in a later operation.

While in the foregoing there has been provided a detailed description of a particular embodiment of the present invention, it is to be understood that all equivalents obvious to those having skill in the art are to be included within the scope of the invention as claimed.

What I claim and desire to secure by Letter Patent is:
1. Apparatus for welding a continuous stay wire to a plurality of line wires in order to form wire mesh, said apparatus comprising a frame, stationary welding die means mounted on said frame, movable welding die means mounted on said frame and being in alignment with said stationary welding die means, means on said stationary die means for receiving said stay wire and retaining it in a loop transverse to the line wires, means rotatably carried by said frame for wrapping said con- tinuous stay wire in a loop on said receiving means in a position transverse to said line wires, means for moving said movable die means toward said stationary die means for maintaining said stay wire and said line wires between said die means during the welding operation, and means operated by said rotatable means to release the stay wire from said receiving means after the movable die means has been moved toward the stationary die means.

2. Apparatus for welding a continuous stay wire to a plurality of upright line wires in order to form wire mesh, said apparatus comprising a frame, stationary welding die means mounted on said frame, movable welding die means mounted on said frame and being in alignment with said stationary welding die means, said line wires passing between said stationary die means and said movable die means and transverse thereto, rotatable pin members carried on opposite ends of said stationary die means for receiving said stay wire, rotating means carried by said frame for wrapping said stay wire around said pin members, means for biasing said movable die means towards said stationary die means for trapping said line wires and said stay wire in a transverse position therebetween, means for welding said line wires to said stay wire when said wires are in said transverse position, said pin members having substantially straight sides normally engaging the stay wire to hold it in a loop transverse to the line wires and sloping sides to release the stay wire, and means to turn the pin members after the wires have been trapped by the dies to present the sloping sides thereof to the stay wire to release it.

3. Apparatus for welding a continuous stay wire to a plurality of upright line wires to form wire mesh, said apparatus comprising a frame, stationary welding die means mounted on said frame, movable welding die means mounted on said frame and being in alignment with said stationary welding die means, means for passing a plurality of said upright stay wires between and transverse to both said welding die means and said stationary die means, rotatable pin members carried by said stationary welding die means for receiving said stay wire, a rotatable arm mounted adjacent said stationary die means and including means for continuously feeding said continuous stay wire to a position transverse to said line wires and for wrapping said stay wire about said rotatable pin members, means for moving said movable welding die means towards said stationary die means, means for welding said wires together when positioned between both said die means, said pin members having substantially straight sides normally engaging the stay wire and sloping sides to release the stay wire, and means operated by rotation of the rotatable arm to turn the pins to present the sloping sides thereof to the stay wire to release the stay wire.

4. The apparatus of claim 3 wherein said means for moving said movable die means includes means for withdrawing said movable die means away from said stationary die means after completion of the welding operation to thereby release the welded wires, and means are provided for carrying said line wires upwardly for another cycle of operation.

5. The apparatus of claim 4 wherein said moving means includes an arm which engages said movable welding die means, an oscillating member which engages said arm, and means for normally biasing said movable welding die means towards said stationary welding die means, said oscillating member and said arm being adapted to withdraw said movable welding die means in opposition to the biasing action of said biasing means.

6. The apparatus of claim 5 wherein said biasing means is an elongated hose having pressurized air therein.

7. Apparatus for welding a continuous stay wire to a plurality of line wires in order to form wire mesh, said apparatus comprising a frame, a substantially horizontal elongated stationary welding die mounted on said frame, a plurality of movable welding dies mounted on said frame and being spaced from and in alignment with said stationary welding die, means for intermittently moving said line wires between said welding dies, a pair of rotatable pin members carried on opposite ends of said stationary die members for receiving said continuous stay wire in upper and lower rows, a wrapping arm rotatably mounted on said frame for wrapping said continuous stay wire around said rotatable pin members in a position transverse to said line wires, means for moving said movable welding dies toward said stationary welding die in order to trap said line wires and said stay wire in transverse position therebetween, means for welding said stay wire to said line wires when in said transverse position, means for withdrawing said movable welding dies from said stationary welding dies after the completion of said welding operation, said pin members having substantially straight sides normally engaging the stay wire and sloping sides to release the stay wire, and means operated by rotation of the rotatable arm to turn the pins to present the sloping sides thereof to the stay wire to release the stay wire.

8. The apparatus of claim 7 wherein said withdrawing means includes a plurality of arms slidably mounted on said frame for engaging each of said movable welding dies, an oscillating member engaging each of said arms in order to withdraw said movable welding dies from said stationary welding die after the welding operation, and means for normally biasing said movable welding dies towards said stationary welding die.

9. The apparatus of claim 7 wherein said biasing means includes an elongated hose having pressurized air therein for causing uniform biasing of said movable welding dies toward said stationary welding die.

10. Apparatus for welding a stay wire to a plurality of line wires in order to form wire mesh, said apparatus comprising a frame, stationary welding die means mounted on said frame, a plurality of movable welding die means mounted on said frame and being aligned with said stationary die means, and elongated biasing means for applying substantially equal pressure to all of said movable welding die means when said line wires are being welded to said stay wire.

11. The apparatus of claim 10 wherein said biasing means includes an elongated hose having pressurized air therein.

12. Apparatus for welding a stay wire to a plurality of line wires in order to form wire mesh, said apparatus comprising a frame, stationary welding die means mounted on said frame, a plurality of bendable movable die means mounted on said frame and being in alignment with said stationary die means for effecting welding of said line wires to said stay wire, and an elongated hose member having pressurized air therein and being adapted to bias said bendable welding die means under substantially constant pressure in order to effect substantially equal welding at each point of welding said stay wire to said line wires.

References Cited by the Examiner

UNITED STATES PATENTS

| | | | |
|---|---|---|---|
| 1,783,948 | 12/1930 | Sommer | 140—112 |
| 1,923,369 | 8/1933 | Gronemeyer et al. | 140—112 |
| 1,961,991 | 6/1934 | Southwell | 140—112 |

WILLIAM J. STEPHENSON, *Primary Examiner.*